(No Model.)

E. W. RICE, Jr.
SYSTEM OF ELECTRIC CONVERSION.

No. 495,229. Patented Apr. 11, 1893.

WITNESSES:
Ira R. Steward
Wm. H. Capel

INVENTOR
E. Wilbur Rice Jr.
BY
Townsend MacArthur
ATTORNEYS

UNITED STATES PATENT OFFICE.

EDWIN WILBUR RICE, JR., OF LYNN, MASSACHUSETTS, ASSIGNOR TO THE THOMSON-HOUSTON ELECTRIC COMPANY, OF CONNECTICUT.

SYSTEM OF ELECTRIC CONVERSION.

SPECIFICATION forming part of Letters Patent No. 495,229, dated April 11, 1893.

Application filed June 18, 1888. Serial No. 277,496. (No model.)

*To all whom it may concern:*

Be it known that I, EDWIN WILBUR RICE, Jr., a citizen of the United States, and a resident of Lynn, in the county of Essex and State of Massachusetts, have invented a certain new and useful System of Electric Conversion, of which the following is a specification.

My invention relates to electric converters or transformers employed for converting electric energy derived from any suitable source into energy upon a local independent circuit containing the work.

My invention is intended especially for application to those forms of converters which consist of an electric motor driven by the energy on the supply circuit, and an electric generator coupled to said motor and connected with the local independent circuit.

The object of the invention is to provide an automatic regulation of the electric generator in accordance with the work demanded of it and at the same time to permit a generator to be used without any commutator for the same.

My invention consists essentially in regulating the power or output of the generator by a coil whose power or effect varies with the counter electro motive force of the motor.

I prefer to carry out my invention by making the regulating or controlling coil operate as a field magnet coil for the generator, though it may be employed in other ways, directly or indirectly, to effect a regulation of the generator without departing from the characteristics of my invention.

The invention consists further in the novel combinations of apparatus and circuits which will be described in connection with the accompanying drawings and then specified in the claims.

Figure 1:
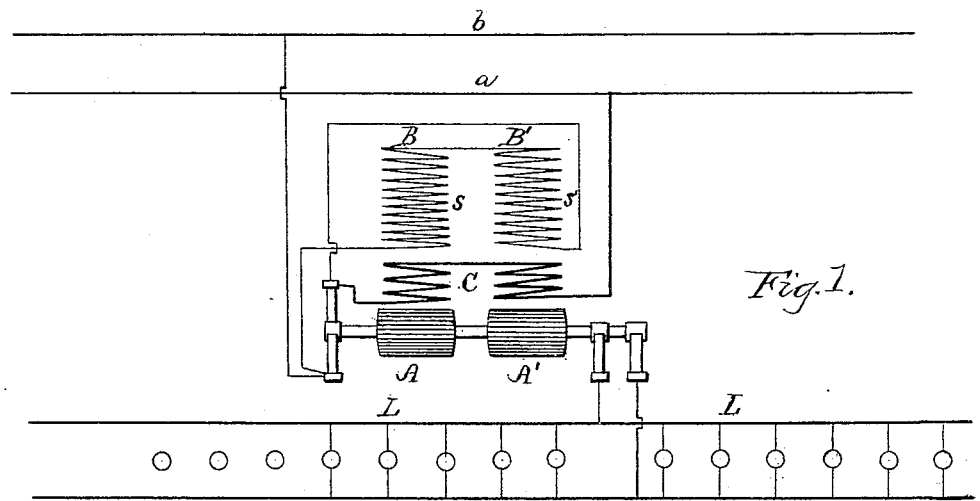
Figure 2:
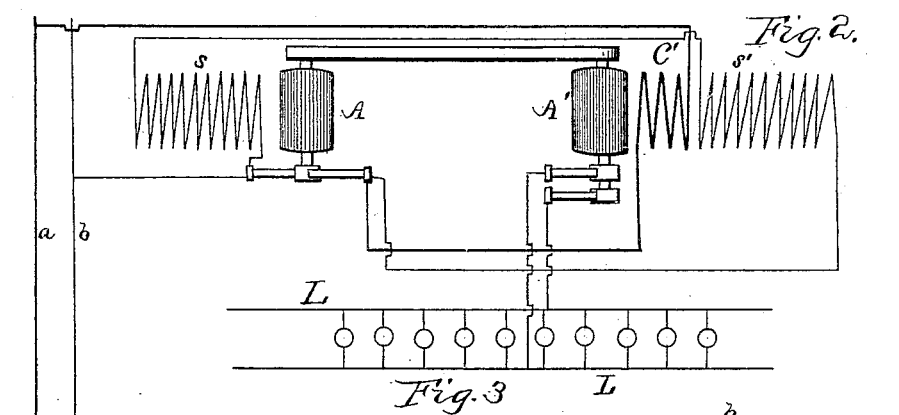
Figure 3:
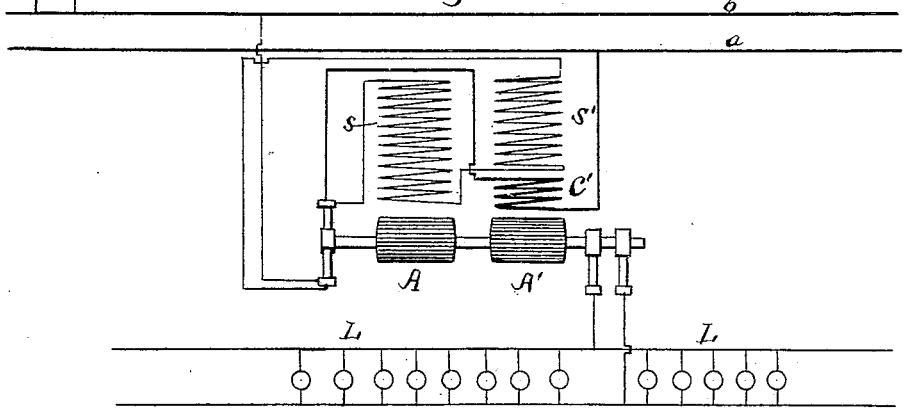

Referring to the drawings:—Figures 1, 2 and 3, illustrate diagrammatically various arrangements of apparatus embodying my invention.

A, indicates the motor armature and A', the generator which supplies the local circuit or feeding line L, L, to which lamps or other devices are connected. The generator armature has its coils connected to said circuits through the usual collecting rings and brushes so that the alternating currents developed in the armature will be fed directly to the local circuit without being rectified or commuted.

The lines or circuits which feed energy to the motors are indicated by the letters a, b. They are supposed in the present case to supply energy of constant potential. The motor is coupled to the generator in any desired way, either by placing the armatures on the same shaft as in Figs. 1 and 3, or by means of a belt or other gear as in Fig. 2.

S, S', indicate respectively field sustaining coils for the motor and generator. These coils convey constantly an exciting current derived from the mains a, b, and are as usual of high resistance. In the compound field winding herein illustrated they are, as shown, in a circuit or branch independent of the commutator. The coils S, S', may be either in series with one another or in multiple as desired.

C, indicates a coarse wire field coil which acts differentially against the winding S, of the motor field and is placed in circuit with the armature A, as indicated. The coil C, may or may not be employed, as desired. In Figs. 2 and 3, it is shown omitted.

A regulating or controlling coil applied in accordance with my invention is indicated by the letter C'. This coil is as will be seen connected between the main a, and the armature of the motor so that the flow of current through the same will obviously vary with the counter electro motive force of said motor which force will depend upon the load put upon the apparatus. The coil C', acts cumulatively or to assist the coil S', and will obviously determine the energy delivered from the armature A', or in the present case determining or regulating the strength of the magnetic field in which said armature revolves. Whenever the counter electro motive force of the armature A, drops owing to increase of load the current flowing through the coil C', will increase for obvious reasons thus raising the potential of the current delivered from the armature A'. On the contrary when the load diminishes and the motor tends to increase in speed the current flowing in the regulating coil C', will diminish thus lowering the energy delivered from the armature A'.

It will of course be understood that the usual devices employed in connection with electric motors on constant potential lines are used for starting said motor and for preventing the undue flow of current through the said armature before it obtains its speed. The coils C, S, act as the coils of a compound wound motor after the manner well understood in the art. It is obviously not necessary to employ the coil C, but as indicated in Fig. 2, the motor field may be sustained entirely by a shunt coil S. As will be obvious, the field of the generator is sustained entirely from the primary mains $a$, $b$, and not by energy developed in its armature A', so that the employment of the commutator in connection with A', becomes unnecessary.

I do not limit myself to any particular resistance of the coil C, or to any particular gage of wire, the essence of my invention consisting in regulating the energy developed in the local portion of the converter by means of a coil the current in which varies with the variations in counter electro motive force of the motor. The regulating coil is preferably supplied with current from the mains which drive the motor, though I do not limit myself in this respect.

Fig. 3, is similar to Fig. 1, with the exception that the coil C, is omitted.

Although I have described the generator as supplying alternating currents to the local circuit it is obvious that my invention is not limited to such arrangement, and that the generator might be of any desired construction for the purpose of supplying either alternating currents or continuous currents through a suitable commutator, or otherwise.

What I claim as my invention is—

1. In a combined electric motor and generator the motor portion of which is supplied from a conductor of approximately constant potential, a regulating or controlling coil for the generator connected to a point whose potential varies with the counter electro motive force of the motor armature, as and for the purpose described.

2. In a combined electric motor and generator, a regulating or controlling coil or circuit for the generator consisting of a fluid magnet coil in a circuit leading to the armature for the motor from a wire or conductor of constant potential.

3. The combination with constant potential supply mains, of an electric motor having a field sustaining coil in a circuit between said mains independent of its armature, a generator driven by said motor, and a field coil for said generator in a circuit leading from a constant potential main to a point whose potential varies with the counter electro motive force of the motor.

4. In a combined motor and generator, two field sustaining coils for the generator, one in a circuit with the motor armature and the other in a separate circuit from the supply main.

5. In an electric transformer or converter supplied from a constant potential main, a regulating coil or circuit for the part thereof connected with the local circuit said regulating coil being connected with the constant potential supply main at one of its terminals and at its other to a point of the transformer circuit connected to said main where the potential varies with the counter electro motive force, of said transformer.

6. The herein described method of regulating the action of a combined motor and generator, consisting in varying the magnetic field of the generator supplying the local circuit by changes in the counter electro-motive force of the motor armature, as and for the purpose described.

7. In a compound motor and generator in which the motor and generator fields have coils connected directly with the supply main, additional field coils connected with said supply mains through an independent circuit which includes the armature of the motor said second coils being applied as described the one to assist and the other to oppose the field magnetism generated by the first named coils.

Signed at Lynn, in the county of Essex and State of Massachusetts.

E. WILBUR RICE, JR.

Witnesses:
MERLE J. WIGHTMAN,
ELIHU THOMSON.